United States Patent
Zhao et al.

(10) Patent No.: US 12,052,984 B2
(45) Date of Patent: Aug. 6, 2024

(54) INTELLIGENT PESTICIDE SPRAYING ROBOT SELF-ADAPTIVE TO TERRAIN OF MOUNTAIN LAND

(71) Applicant: CHONGQING UNIVERSITY OF ARTS AND SCIENCES, Chongqing (CN)

(72) Inventors: Lijun Zhao, Chongqing (CN); Zihan Wang, Chongqing (CN); Yang Yu, Chongqing (CN); Qiang Li, Chongqing (CN); Chenglin Wang, Chongqing (CN); Cheng Lv, Chongqing (CN); Pengcheng Lin, Chongqing (CN); Chunjiang Li, Chongqing (CN); Yinan Tian, Chongqing (CN); Naifu Zhang, Chongqing (CN); Qi Liao, Chongqing (CN); Lishi Ji, Chongqing (CN); Boxin Li, Chongqing (CN)

(*) Notice: Subject to any disclaimer, the term of this patent is extended or adjusted under 35 U.S.C. 154(b) by 911 days.

(21) Appl. No.: 17/094,954

(22) Filed: Nov. 11, 2020

(65) Prior Publication Data
US 2021/0392867 A1    Dec. 23, 2021

Related U.S. Application Data

(63) Continuation of application No. PCT/CN2020/112118, filed on Aug. 28, 2020.

(30) Foreign Application Priority Data

Jun. 17, 2020  (CN) .......................... 202010554178.6

(51) Int. Cl.
*A01M 7/00*    (2006.01)
*A01B 69/00*   (2006.01)

(52) U.S. Cl.
CPC .......... *A01M 7/0089* (2013.01); *A01B 69/001* (2013.01); *A01M 7/0014* (2013.01);
(Continued)

(58) Field of Classification Search
CPC .............. A01M 7/0014; A01M 7/0042; A01M 7/0053; A01M 7/0057; A01M 7/0075
(Continued)

(56) References Cited

U.S. PATENT DOCUMENTS

| 7,413,132 B1* | 8/2008 | Bogart | A01M 7/0053 239/164 |
| 2022/0142140 A1* | 5/2022 | Wakuta | A01M 7/0042 |

FOREIGN PATENT DOCUMENTS

CN    109221068 A  *  1/2019  .......... A01M 7/0042

* cited by examiner

*Primary Examiner* — Jason J Boeckmann

(57) ABSTRACT

An intelligent pesticide spraying robot self-adaptive to terrain of mountain land is provided. Walking mechanisms are respectively connected to both side ends of a chassis. A pesticide spraying mechanism includes rotary drive mechanisms respectively connected to both sides of the rear end of the chassis, telescopic spray boom mechanisms correspondingly connected to the rotary drive mechanisms, rotary nozzle mechanisms correspondingly connected to the telescopic spray boom mechanisms, a liquid pesticide storage box fixed to the top of the chassis, a first water pump fixed in the liquid pesticide storage box, and first water pipes in communication with the first water pump and the rotary nozzle mechanisms. A control chip of a control identification mechanism is communicatively connected to the walking mechanisms, the rotary drive mechanisms, the telescopic spray boom mechanisms, the rotary nozzle mechanisms, the first water pump, a front-end camera, side-end cameras and ultrasonic sensors respectively.

9 Claims, 5 Drawing Sheets

(52) U.S. Cl.
CPC ........ *A01M 7/0042* (2013.01); *A01M 7/0075* (2013.01); *A01M 7/0085* (2013.01)

(58) Field of Classification Search
USPC ................................ 239/159–163, 165, 723
See application file for complete search history.

INTELLIGENT PESTICIDE SPRAYING ROBOT SELF-ADAPTIVE TO TERRAIN OF MOUNTAIN LAND

TECHNICAL FIELD

The present invention relates to the technical field of agricultural robots, and more particularly relates to an intelligent pesticide spraying robot self-adaptive to terrain of mountain land.

BACKGROUND

Agricultural robots are special robots used to assist or complete agricultural production. Due to the presence of agricultural robots, the manual workload is greatly reduced, the working efficiency is improved, and the working time is reduced. Most pesticide spraying robots on the market at present are controlled by humans and then cannot be fully automated. Thus, in terms of pesticide spraying, the spraying range of a spray irrigation device is difficult to control, which is likely to cause waste of resources, and the pesticide spraying position cannot be accurately located, which is likely to cause the problems of pesticide deposition and exceeding of the pesticide spraying range, causing damage to crops. In addition, most agricultural pesticide spraying robots at present walk by wheels, easily causing problems such as overturning and difficulty in walking when encountering complex and rough roads.

Therefore, how to provide a full-automatic pesticide spraying robot which can accurately control the pesticide spraying range is a problem to be urgently solved by those skilled in the art.

SUMMARY

In view of this, the present invention provides an intelligent pesticide spraying robot self-adaptive to terrain of mountain land, which can accurately locate the pesticide spraying position and flexibly control the spraying range, thereby avoiding waste of resources and the problem of pesticide deposition, and reducing damage to crops.

To achieve the above purpose, the present invention adopts the following technical solution:

An intelligent pesticide spraying robot self-adaptive to terrain of mountain land, comprising:
a chassis internally provided with an accommodating cavity;
walking mechanisms respectively connected to both side ends of the chassis, wherein the front end of the chassis is the advancing direction of the walking mechanisms, and the rear end of the chassis is opposite to the front end of the chassis in direction;
a pesticide spraying mechanism including rotary drive mechanisms respectively connected to both sides of the rear end of the chassis, telescopic spray boom mechanisms correspondingly connected to the rotary drive mechanisms, rotary nozzle mechanisms correspondingly connected to the telescopic spray boom mechanisms, a liquid pesticide storage box fixed to the top of the chassis, a first water pump fixed in the liquid pesticide storage box, and first water pipes in communication with the first water pump and the rotary nozzle mechanisms; and
a control identification mechanism including a front-end camera close to the front end of the chassis and fixed to the top of the chassis, side-end cameras respectively fixed to the two sides of the chassis and close to the rear end of the chassis, ultrasonic sensors respectively fixed to the two sides of the chassis and close to the front end of the chassis, a control chip fixed in the chassis and a storage battery, wherein the storage battery is electrically connected to the walking mechanisms, the rotary drive mechanisms, the telescopic spray boom mechanisms, the rotary nozzle mechanisms, the first water pump, the front-end camera, the side-end cameras, the ultrasonic sensors and the control chip respectively, and the control chip is communicatively connected to the walking mechanisms, the rotary drive mechanisms, the telescopic spray boom mechanisms, the rotary nozzle mechanisms, the first water pump, the front-end camera, the side-end cameras and the ultrasonic sensors respectively.

The present invention acquires roadblock conditions and other environment conditions in the advancing direction of the walking mechanisms through the front-end camera close to the front end of the chassis and fixed to the top of the chassis, acquires roadblock conditions of both sides of the chassis through the ultrasonic sensors fixed to the two sides of the chassis and close to the front end of the chassis, and acquires information about plants on both sides of the chassis and other environment conditions through the side-end cameras respectively fixed to the two sides of the chassis and close to the rear end of the chassis. Therefore, the present invention can improve the comprehensiveness and accuracy of the information acquired from the surrounding environment through the cooperation between the front-end camera, the ultrasonic sensors and the side-end cameras; and the front-end camera, the ultrasonic sensors, and the side-end cameras of the present invention transmit the acquired information to the control chip, thus the control chip controls the walking mechanisms, the rotary drive mechanisms, the telescopic spray boom mechanisms and the rotary nozzle mechanisms simultaneously, so that the present invention can accurately locate the pesticide spraying position by controlling the advancing direction, advancing speed and other factors of the walking mechanisms, macroscopically adjust the pesticide spraying angle by controlling the rotary drive mechanisms, adjust the pesticide spraying height by controlling the telescopic spray boom mechanisms, and further macroscopically adjust the pesticide spraying range by controlling the rotary nozzle mechanisms. Therefore, the present invention can flexibly control the pesticide spraying range, so as to avoid the waste of resources and the problem of pesticide deposition, and reduce the damage to crops.

Preferably, the rotary drive mechanisms comprise:
base drive motors, wherein the base drive motors are multiple in number, are close to the rear end of the chassis and are symmetrically fixed to both sides of the accommodating cavity, the output shaft of each of the base drive motors penetrates through the cavity wall of the accommodating cavity and is rotationally connected to the cavity wall of the accommodating cavity by a bearing, and the base drive motors are electrically connected to the storage battery and communicatively connected to the control chip respectively;
base plates, wherein the base plates are multiple in number, are located outside the accommodating cavity and located at the rear end of the chassis, and are fixedly connected to the output shafts of the base drive motors in a one-to-one correspondence mode; and
support rods, wherein the support rods are multiple in number, are erected at the rear end of the chassis and correspond to the base plates one to one, one ends of the support rods are fixedly connected to corresponding base plates, and the other ends thereof are free ends; and the telescopic spray boom mechanisms are fixed to the support rods.

The control chip of the present invention controls the rotation direction and rotation speed of the base drive motors according to the information transmitted by the front-end camera, the ultrasonic sensors and the side-end cameras, in order that the base drive motors control the rotation direction and rotation speed to drive the base plates and the support rods, so that the present invention can macroscopically adjust the pesticide spraying angle.

Preferably, the telescopic spray boom mechanisms comprise:
DC motors, wherein the DC motors are multiple in number and are fixed to the support rods in a one-to-one correspondence mode, and the DC motors are electrically connected to the storage battery and communicatively connected to the control chip respectively;
lead screws, wherein the lead screws are multiple in number and are arranged on the support rods in a one-to-one correspondence mode, and both ends of each of the lead screws are rotationally connected to the corresponding support rods by bearings;
nut blocks, wherein the nut blocks are multiple in number and are in helix transmission connection with the lead screws in a one-to-one correspondence mode; and
moving rods, wherein the moving rods are multiple in number and are fixedly connected to the nut blocks in a one-to-one correspondence mode, one end of each of the moving rods is fixed to the corresponding nut block, the other end thereof is a free end, and each of the moving rods is parallel to the corresponding lead screw; and the rotary nozzle mechanisms are fixed to the free ends of the moving rods.

The control chip of the present invention controls the rotation direction and rotation speed of the DC motors according to the information transmitted by the front-end camera, the ultrasonic sensors and the side-end cameras, in order that the DC motors drive the lead screws to rotate to further drive the nut blocks to move at a speed and direction relative to the lead screws, so that the movements of the moving rods and the nut blocks are synchronized, to realize the telescopic movement of the moving rods. Therefore, the adjustment effect of the present invention on the pesticide spraying height is achieved, so as to be suitable for carrying out pesticide spraying on plants of different heights.

Preferably, the rotary nozzle mechanisms comprise:
steering engines, wherein the steering engines are multiple in number and are fixed to the free ends of the moving rods in a one-to-one correspondence mode, and the steering engines are electrically connected to the storage battery and communicatively connected to the control chip respectively; and
first atomizing nozzles, wherein the first atomizing nozzles are multiple in number and are fixed to the output shafts of the steering engines in a one-to-one correspondence mode.

The control chip of the present invention controls the operating states of the steering engines according to the information transmitted by the front-end camera, the ultrasonic sensors and the side-end cameras, in order that the steering engines can control the rotation angles of the first atomizing nozzles, so that the further micro-adjustment effect of the present invention on the pesticide spraying angle can be achieved.

Preferably, the liquid pesticide storage box is close to the rear end of the chassis and is fixed to the top of the chassis, and the first water pump is close to the rear end of the chassis and is fixed in the liquid pesticide storage box; and
the first water pipes are multiple in number, the multiple first water pipes are in communication with the first water pump respectively, and the multiple first water pipes are connected to the first atomizing nozzles in a one-to-one correspondence mode.

The liquid pesticide storage box of the present invention stores the liquid pesticide to be sprayed, the control chip controls the operating state of the first water pump according to the information transmitted by the front-end camera, the ultrasonic sensors and the side-end cameras, and then the first water pump delivers the liquid pesticide to the first atomizing nozzles through the first water pipes and then sprays same out.

Because the first atomizing nozzles of the present invention are multiple in number and, correspond to the steering engines, the moving rods, the nut blocks, the lead screws, the DC motors, the support rods, the base plates and the base drive motors one to one in sequence and are symmetrically arranged on both sides of the rear end of the chassis, the present invention can improve the efficiency of spraying pesticide on plants.

Preferably, the control identification mechanism further comprises an automatic light compensation lamp, wherein a camera supporting seat is fixed to the top of the chassis close to the front end of the chassis, the front-end camera and the automatic light compensation lamp are respectively fixed to both sides of the camera supporting seat; and the automatic light compensation lamp is electrically connected to the storage battery and communicatively connected to the control chip respectively.

According to the present invention, by arranging the automatic light compensation lamp at the top of the chassis close to the front end of the chassis and fixing the automatic light compensation lamp and the front-end camera to both sides of the camera supporting seat through the camera supporting seat, the control chip of the present invention can control the operating state of the automatic light compensation lamp according to the information transmitted by the front-end camera, the ultrasonic sensors and the side-end cameras, in order that the present invention can control the operating state of the automatic light compensation lamp according to different external environment conditions to assist the front-end camera, so that the front-end camera of the present invention can accurately acquire information about the external environment in different circumstances, so as to further improve the accuracy of locating the pesticide spraying position by the present invention and further improve the accuracy of controlling the pesticide spraying range by the present invention.

Preferably, further comprising a spray irrigation mechanism, wherein the irrigation mechanism includes a switch fixed to the chassis, a water storage tank located between the liquid pesticide storage box and the camera supporting seat and fixed to the top of the chassis, a second water pump fixed in the water storage tank, a second atomizing nozzle fixed in the middle of the camera supporting seat, and a second water pipe in communication with the second water pump and the second atomizing nozzle, wherein the second water pump is electrically connected to the storage battery and the switch respectively.

According to the present invention, when spray irrigation is needed, the switch is turned on, the second water pump is controlled by the switch to turn on, and the second water pump delivers the water stored in the water storage tank to the second atomizing nozzle through the second water pipe and then sprays same out to achieve the effect of spray irrigation. Thus, the present invention integrates dual functions of spray irrigation and pesticide spraying, so that the robot of the invention can perform spray irrigation and pesticide spraying simultaneously during the traveling process.

Preferably, the walking mechanism comprises:
a driving wheel drive motor, wherein the driving wheel drive motor is close to the side end of the chassis and is fixed in the accommodating cavity, and the output shaft of the driving wheel drive motor penetrates through the cavity wall of the accommodating cavity and is rotationally connected to the cavity wall of the accommodating cavity by a bearing; and the driving wheel drive motor is electrically connected to the storage battery and communicatively connected to the control chip respectively;
a track structure bracket fixed to the side end of the chassis;
driven wheel structure brackets fixedly connected to the track structure bracket;
a driving wheel, wherein the driving wheel is fixedly connected to the output shaft of the driving wheel drive motor, and the driving wheel is rotationally connected to the track structure bracket;
driven wheels rotationally connected to the driven wheel structure brackets and the track structure bracket respectively;
tracks simultaneously in transmission connection with the driving wheel and the driven wheels respectively;
suspension strutbeams, wherein both ends of each suspension strutbeam are fixed to the track structure bracket and the driven wheel structure brackets respectively; and
springs, wherein both ends of each spring are fixed to the track structure bracket and the driven wheel structure brackets respectively.

The control chip of the present invention controls the rotation speed and rotation direction of the driving wheel drive motor according to the information transmitted by the front-end camera, the ultrasonic sensors and the side-end cameras, so as to control the operation of the driving wheel, the driven wheels and the tracks in sequence through the driving wheel drive motor, so that the present invention can accurately locate the pesticide spraying position.

Moreover, because each walking mechanism of the present invention adopts a track structure, the robot of the present invention can easily walk and move even on rough and complex terrain of mountain land. Meanwhile, because the suspension strutbeams and the springs are respectively fixed between the track structure bracket and the driven wheel structure bracket, it can be ensured that the top of the chassis is always kept level when the intelligent pesticide spraying robot self-adaptive to terrain of mountain land of the present invention walks on rough and complex terrain, so that the various mechanisms arranged on the chassis can operate normally.

Preferably, further comprising a voltage dropping module, wherein the voltage dropping module is electrically connected to the storage battery, the driving wheel drive motor, the base drive motor, the DC motor, the steering engine, the first water pump, the front-end camera, the side-end camera, the ultrasonic sensor, the automatic light compensation lamp, the control chip, the switch and the second water pump respectively.

In the present invention, some components that need to be electrically connected is made to operate normally through the voltage dropping module, so that each component does not operate abnormally or even be burned out.

Preferably, the angles of the sensing part of each of the ultrasonic sensors facing the front end of the chassis and the side ends of the chassis are 45° respectively.

The ultrasonic sensors can determine obstacles in front through ultrasonic ranging, and if there is an obstacle, the driving wheel drive motor is controlled by the control chip to make the robot walk leftward or rightward.

Preferably, the control chip includes an arduino MEGA2560 control board and a Raspberry Pi 4b control board, wherein the built-in program in the Raspberry Pi 4b control board includes an opencv vision processing mechanism which can complete information transmission (including transmitting control information according to the control identification mechanism, and controlling the walking mechanisms and pesticide spraying mechanism) with the arduino MEGA2560 control board through serial communication.

It can be known from the above technical solution that compared with the prior art, the present invention discloses and provides an intelligent pesticide spraying robot self-adaptive to terrain of mountain land, which can achieve the following technical effects:

The present invention acquires roadblock conditions and other environment conditions in the advancing direction of the walking mechanisms through the front-end camera close to the front end of the chassis and fixed to the top of the chassis, acquires roadblock conditions of both sides of the chassis through the ultrasonic sensors fixed to the two sides of the chassis and close to the front end of the chassis, and acquires information about plants on both sides of the chassis and other environment conditions through the side-end cameras respectively fixed to the two sides of the chassis and close to the rear end of the chassis. Therefore, the present invention can improve the comprehensiveness and accuracy of information acquired from the surrounding environment through the cooperation between the front-end camera, the ultrasonic sensors and the side-end cameras; and the front-end camera, the ultrasonic sensors, and the side-end cameras of the present invention transmit the acquired information to the control chip, thus the control chip controls the walking mechanisms, the rotary drive mechanisms, the telescopic spray boom mechanisms and the rotary nozzle mechanisms simultaneously, so that the present invention can accurately locate the pesticide spraying position by controlling the advancing direction, advancing speed and other factors of the walking mechanisms, macroscopically adjust the pesticide spraying angle by controlling the rotary drive mechanisms, adjust the pesticide spraying height by controlling the telescopic spray boom mechanisms, and further macroscopically adjust the pesticide spraying range by controlling the rotary nozzle mechanisms. Therefore, the present invention can flexibly control of the pesticide spraying range, so as to avoid the waste of resources and the problem of pesticide deposition, and reduce the damage to crops.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are

Figure 1:
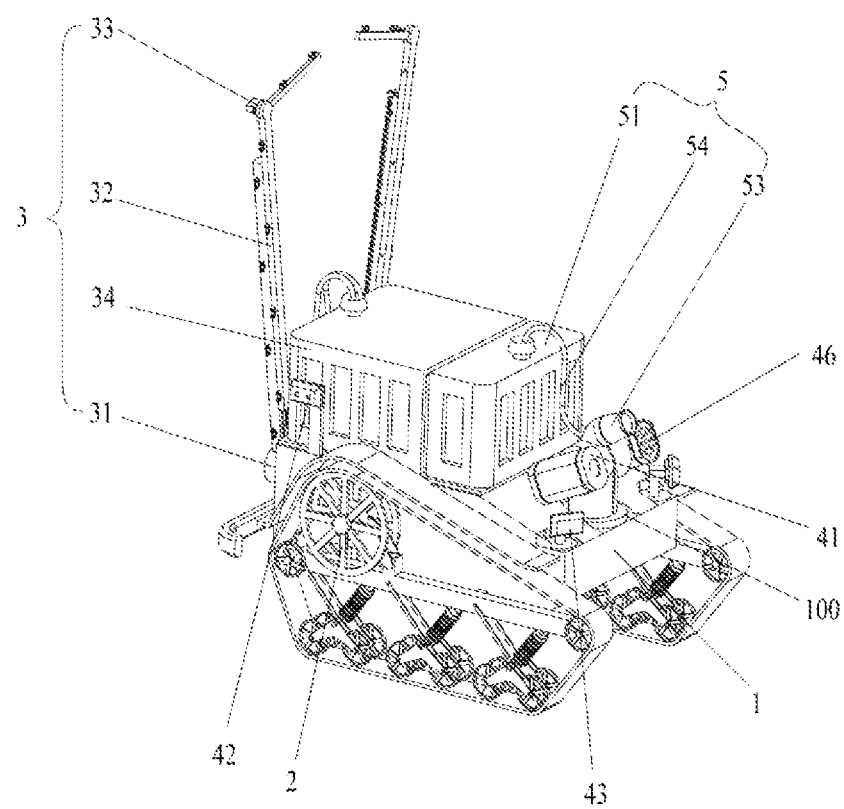
FIG. 1 is an overall structural diagram of an intelligent pesticide spraying robot self-adaptive to terrain of mountain land of the present invention.
Figure 2:
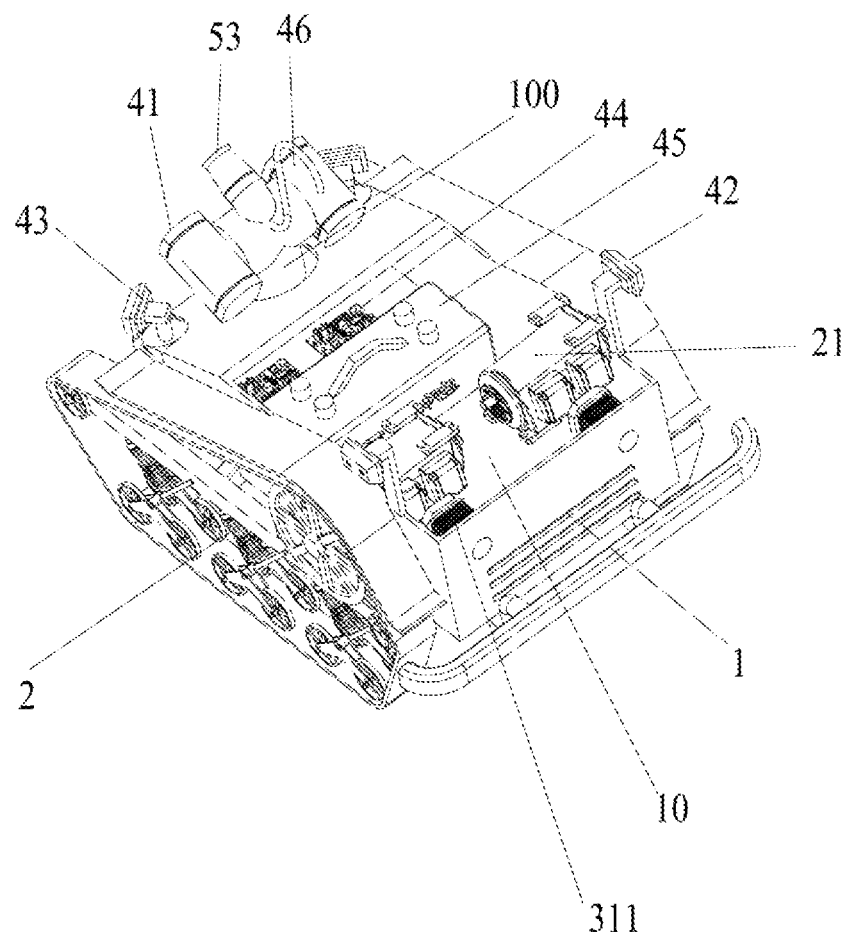
FIG. 2 is an internal structural diagram of an intelligent pesticide spraying robot self-adaptive to terrain of mountain land of the present invention.
Figure 3:
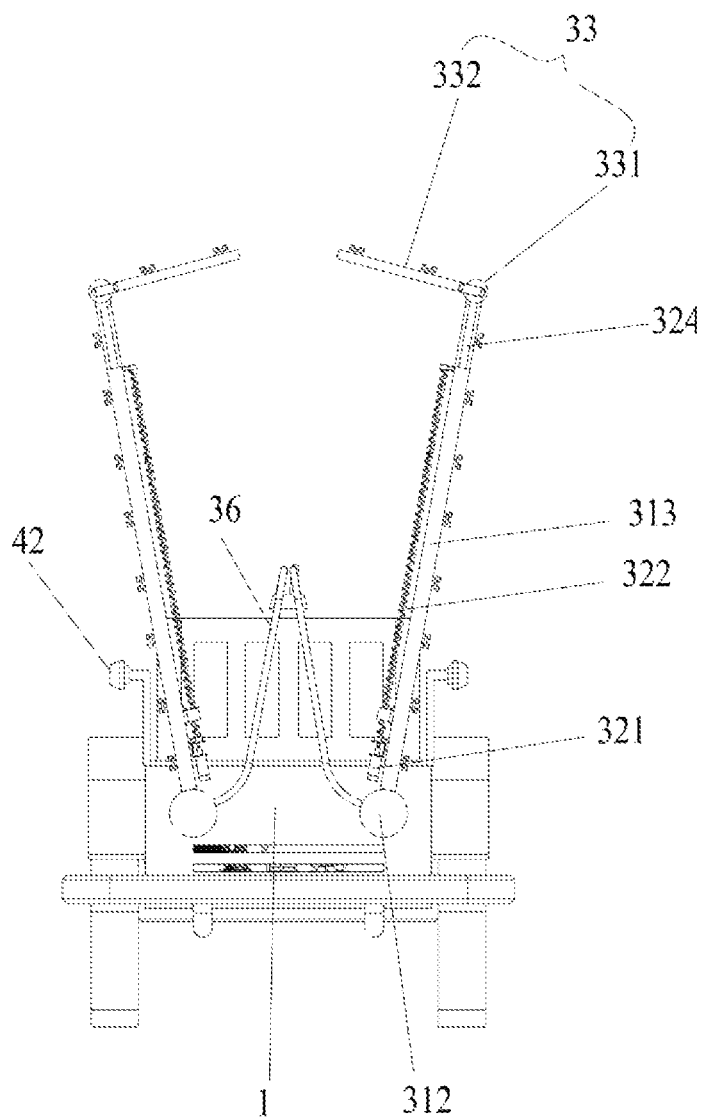
FIG. 3 is a back view of an of an intelligent pesticide spraying robot self-adaptive to terrain of mountain land of the present invention.
Figure 4:
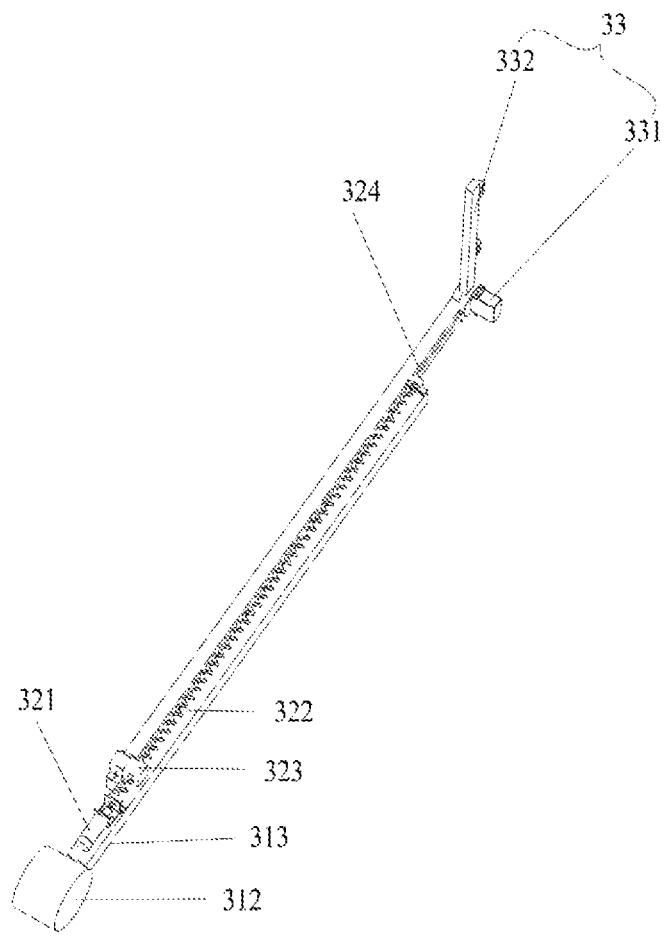
FIG. 4 is a structural diagram showing connection between a rotary drive mechanism, a telescopic spray boom mechanism and a rotary nozzle mechanism of an of an intelligent pesticide spraying robot self-adaptive to terrain of mountain land of the present invention.
Figure 5:
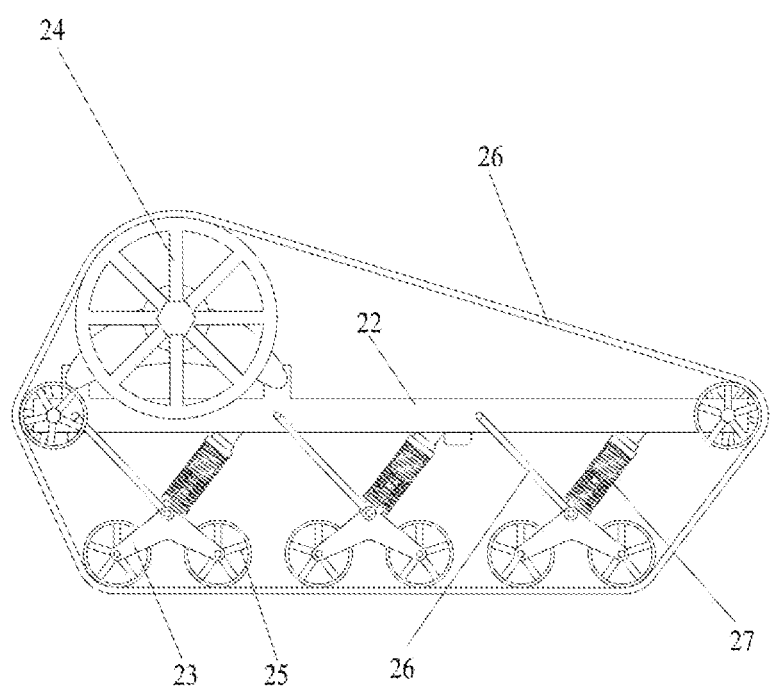
FIG. 5 is a structural diagram of a walking mechanism of an of an intelligent pesticide spraying robot self-adaptive to terrain of mountain land of the present invention.

In the figures, 1—chassis; 10—accommodating cavity; 2—walking mechanism; 3—pesticide spraying mechanism; 31—rotary drive mechanism; 32—telescopic spray boom mechanism; 33—rotary nozzle mechanism; 34—liquid pesticide storage box; 36—first water pipe; 41—front-end camera; 42—side-end camera; 43—ultrasonic sensor; 44—control chip; 45—storage battery; 311—base drive motor; 312—base plate; 313—support rod; 321—DC motor; 322—lead screw; 323—nut block; 324—moving rod; 331—steering engine; 332—first atomizing nozzle; 46—automatic light compensation lamp; 100—camera supporting seat; 5—spray irrigation mechanism; 51—water storage tank; 53—second atomizing nozzle; 54—second water pipe; 21—driving wheel drive motor; 22—track structure bracket; 23—driven wheel structure bracket; 24—driving wheel; 25—driven wheel; 26—track; 27—suspension strutbeam; 28—spring.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiments of the present invention disclose an intelligent pesticide spraying robot self-adaptive to terrain of mountain land, comprising:

a chassis 1 internally provided with an accommodating cavity 10;

walking mechanisms 2, wherein the walking mechanisms 2 are respectively connected to both side ends of the chassis 1, the front end of the chassis 1 is the advancing direction of the walking mechanisms 2, and the rear end of the chassis 1 is opposite to the front end of the chassis 1 in direction;

a pesticide spraying mechanism 3 including rotary drive mechanisms 31 respectively connected to both sides of the rear end of the chassis 1, telescopic spray boom mechanisms 32 correspondingly connected to the rotary drive mechanisms 31, rotary nozzle mechanisms 33 correspondingly connected to the telescopic spray boom mechanisms 32, a liquid pesticide storage box 34 fixed to the top of the chassis 1, a first water pump fixed in the liquid pesticide storage box 34, and first water pipes 36 in communication with the first water pump and the rotary nozzle mechanisms 33; and a control identification mechanism including a front-end camera 41 close to the front end of the chassis 1 and fixed to the top of the chassis 1, side-end cameras 42 respectively fixed to the two sides of the chassis 1 and close to the rear end of the chassis 1, ultrasonic sensors 43 respectively fixed to the two sides of the chassis 1 and close to the front end of the chassis 1, a control chip 44 fixed in the chassis 1 and a storage battery 45, wherein the storage battery 45 is electrically connected to the walking mechanisms 2, the rotary drive mechanisms 31, the telescopic spray boom mechanisms 32, the rotary nozzle mechanisms 33, the first water pump, the front-end camera 41, the side-end cameras 42, the ultrasonic sensors 43 and the control chip 44 respectively, and the control chip 44 is communicatively connected to the walking mechanisms 2, the rotary drive mechanisms 31, the telescopic spray boom mechanisms 32, the rotary nozzle mechanisms 33, the first water pump, the front-end camera 41, the side-end cameras 42 and the ultrasonic sensors 43 respectively.

To further optimize the above technical solution, the rotary drive mechanisms 31 comprise:

base drive motors 311, wherein the base drive motors 311 are multiple in number, are close to the rear end of the chassis 1 and are symmetrically fixed to both sides of the accommodating cavity 10, the output shaft of each of the base drive motors 311 penetrates through the cavity wall of the accommodating cavity 10 and is rotationally connected to the cavity wall of the accommodating cavity 10 by a bearing, and the base drive motors 311 are electrically connected to the storage battery 45 and communicatively connected to the control chip 44 respectively;

base plates 312, wherein the base plates 312 are multiple in number, are located outside the accommodating cavity 10 and located at the rear end of the chassis 1, and are fixedly connected to the output shafts of the base drive motors 311 in a one-to-one correspondence mode; and support rods 313, wherein the support rods 313 are multiple in number, are erected at the rear end of the chassis 1 and correspond to the base plates 312 one to one, one ends of the support rods 313 are fixedly connected to corresponding base plates 312, and the other ends thereof are free ends; and the telescopic spray boom mechanisms 32 are fixed to the support rods 313.

To further optimize the above technical solution, the telescopic spray boom mechanisms 32 comprise:

DC motors 321, wherein the DC motors 321 are multiple in number and are fixed to the support rods 313 in a one-to-one correspondence mode, and the DC motors 321 are electrically connected to the storage battery 45 and communicatively connected to the control chip 44 respectively;

lead screws 322, wherein the lead screws 322 are multiple in number and are arranged on the support rods 313 in a one-to-one correspondence mode, and both ends of each of the lead screws 322 are rotationally connected to the corresponding support rods 313 by bearings;

nut blocks 323, wherein the nut blocks 323 are multiple in number and are in helix transmission connection with the lead screws 322 in a one-to-one correspondence mode; and moving rods 324, wherein the moving rods 324 are multiple in number and are fixedly connected to the nut blocks 323 in a one-to-one correspondence mode, one end of each of the moving rods 324 is fixed to the corresponding nut block 323, the other end thereof is a free end, and each of the moving rods 324 is parallel to the corresponding lead screw 322; and the rotary nozzle mechanisms 33 are fixed to the free ends of the moving rods 324.

To further optimize the above technical solution, the rotary nozzle mechanisms 33 comprise:

steering engines 331, wherein the steering engines 331 are multiple in number and are fixed to the free ends of the moving rods 324 in a one-to-one correspondence mode, and the steering engines 331 are electrically connected to the storage battery 45 and communicatively connected to the control chip 44 respectively; and first atomizing nozzles 332, wherein the first atomizing nozzles 332 are multiple in number and are fixed to the output shafts of the steering engines 331 in a one-to-one correspondence mode.

To further optimize the above technical solution, the liquid pesticide storage box 34 is close to the rear end of the chassis 1 and is fixed to the top of the chassis 1, and the first water pump is close to the rear end of the chassis 1 and is fixed in the liquid pesticide storage box 34;

the first water pipes 36 are multiple in number, the multiple first water pipes 36 are in communication with the first water pump respectively, and the multiple first water pipes 36 are connected to the first atomizing nozzles 332 in a one-to-one correspondence mode.

To further optimize the above technical solution, the control identification mechanism further comprises an automatic light compensation lamp 46, wherein a camera supporting seat 100 is fixed to the top of the chassis 1 close to the front end of the chassis 1, the front-end camera 41 and the automatic light compensation lamp 46 are respectively fixed to both sides of the camera supporting seat 100; and the automatic light compensation lamp 46 is electrically connected to the storage battery 45 and communicatively connected to the control chip 44 respectively.

To further optimize the above technical solution, further comprising a spray irrigation mechanism 5, wherein the spray irrigation mechanism 5 includes a switch fixed to the chassis 1, a water storage tank 51 located between the liquid pesticide storage box 34 and the camera supporting seat 100 and fixed to the top of the chassis 1, a second water pump fixed in the water storage tank 51, a second atomizing nozzle 53 fixed in the middle of the camera supporting seat 100, and a second water pipe 54 in communication with the second water pump and the second atomizing nozzle 53; wherein the second water pump is electrically connected to the storage battery 45 and the switch respectively.

To further optimize the above technical solution, the walking mechanism 2 comprises:

a driving wheel drive motor 21, wherein the driving wheel drive motor 21 is close to the side end of the chassis 1 and is fixed in the accommodating cavity 10, and the output shaft of the driving wheel drive motor 21 penetrates through the cavity wall of the accommodating cavity 10 and is rotationally connected to the cavity wall of the accommodating cavity 10 by a bearing; and the driving wheel drive motor 21 is electrically connected to the storage battery 45 and communicatively connected to the control chip 44 respectively;

a track structure bracket 22 fixed to the side end of the chassis 1;

driven wheel structure brackets 23 fixedly connected to the track structure bracket 22;

a driving wheel 24, wherein the driving wheel 24 is fixedly connected to the output shaft of the driving wheel drive motor 21, and the driving wheel 24 is rotationally connected to the track structure bracket 22;

driven wheels 25 rotationally connected to the driven wheel structure brackets 23 and the track structure bracket 22 respectively;

tracks 26 simultaneously in transmission connection with the driving wheel 24 and the driven wheels 25 respectively;

suspension strutbeams 27, wherein both ends of each suspension strutbeam 27 are fixed to the track structure bracket 22 and the driven wheel structure brackets 23 respectively; and springs 28, wherein both ends of each spring 28 are fixed to the track structure bracket 22 and the driven wheel structure brackets 23 respectively.

To further optimize the above technical solution, further comprising a voltage dropping module, wherein the voltage dropping module is electrically connected to the storage battery 45, the driving wheel drive motor 21, the base drive motor 311, the DC motor 321, the steering engine 331, the first water pump, the front-end camera 41, the side-end camera 42, the ultrasonic sensor 43, the automatic light compensation lamp 46, the control chip 44, the switch and the second water pump respectively.

To further optimize the above technical solution, the angles of the sensing part of each of the ultrasonic sensors 43 facing the front end of the chassis 1 and the side ends of the chassis 1 are 45° respectively.

To further optimize the above technical solution, the control chip includes an arduino MEGA2560 control board and a Raspberry Pi 4b control board, wherein the built-in program in the Raspberry Pi 4b control board includes an opencv vision processing mechanism.

Embodiment 1

When the present invention only needs to spray plants, the present invention acquires roadblock conditions and other environment conditions in the advancing direction of the walking mechanisms 2 through the front-end camera 41 close to the front end of the chassis 1 and fixed to the top of the chassis 1, and acquires roadblock conditions of both sides of the chassis 1 through the ultrasonic sensors 43 fixed to the two sides of the chassis 1 and close to the front end of the chassis 1, and the front-end camera 41 and the ultrasonic sensors 43 transmit the information about the roadblock conditions and surrounding environment conditions to the control chip 44 (the control chip 44 in the prior art includes: an arduino MEGA2560 control board and a Raspberry Pi 4b control board, wherein the built-in program in the Raspberry Pi 4b control board includes an opencv vision processing mechanism which can complete information transmission with the arduino MEGA2560 control board through serial communication). Thus, the control chip 44 controls the movement of the driving wheel drive motor 21 according to the acquired information about the roadblock conditions and surrounding environment conditions, and then controls the movement of the walking mechanisms 2 of the present invention, so the robot walks forward, backward, leftward or rightward. Thus, the present invention can accurately locate the pesticide spraying position by controlling the advancing direction, advancing speed and other factors of the walking mechanisms, avoiding waste of resources and the problem of pesticide deposition, and reducing damage to crops;

meanwhile, the present invention acquires information about plants on both sides of the chassis 1 and other environment conditions through the side-end cameras 42 respectively fixed to the two sides of the chassis 1 and close to the rear end of the chassis 1, and transmits the information about plants and other environment conditions to the control chip 44, and thus the control chip 44 controls the rotation direction and rotation speed of the base drive motors 311, in order that the base drive motors 311 control the rotation direction and rotation speed to drive the base plates 312 and the support rods 313, so that the present invention can macroscopically adjust the pesticide spraying angle; in the meantime, the control chip 44 of the present invention can control the rotation direction and rotation speed of the DC motors 321, in order that the DC motors 321 drive the lead screws 322 to rotate to further drive the nut blocks 323 to move at a speed and direction relative to the lead screws 322, so that the movements of the moving rods 324 and the nut blocks 323 are synchronized, to realize the telescopic movement of the moving rods 324, therefore, the adjustment effect of the present invention on the pesticide spraying height is achieved, so as to be suitable for carrying out pesticide spraying on plants of different heights; moreover, the control chip 44 of the present invention can control the operating states of the steering engines 331 simultaneously, in order that the steering engines 331 can control the rotation angles of the first atomizing nozzles 332, so that the further micro-adjustment effect of the present invention on the pesticide spraying angle is achieved, and thus the present invention can flexibly control the pesticide spraying range;

and in addition, because the control chip 44 controls the pesticide spraying mechanism 3 to operate only after the side-end cameras 42 of the present invention acquire information about plants, the pesticide spraying mechanism 3 does not perform pesticide spraying operation in the absence of plants, so intermittent pesticide spraying is formed, avoiding the waste of pesticides.

Therefore, the present invention can improve the comprehensiveness and accuracy of information acquired from the surrounding environment through the cooperation between the front-end camera 41, the ultrasonic sensors 43 and the side-end cameras 42; and the front-end camera 41, the ultrasonic sensors 43, and the side-end cameras 42 of the present invention transmit the acquired information to the control chip 44, thus the control chip 44 controls the walking mechanisms 2, the rotary drive mechanisms 31, the telescopic spray boom mechanisms 32 and the rotary nozzle mechanisms 33 simultaneously, so that the present invention can accurately locate the pesticide spraying position by controlling the advancing direction, advancing speed and other factors of the walking mechanisms 2, macroscopically adjust the pesticide spraying angle by controlling the rotary drive mechanisms 31, adjust the pesticide spraying height by controlling the telescopic spray boom mechanisms 32, and further macroscopically adjust the pesticide spraying range by controlling the rotary nozzle mechanisms 33. Therefore, the present invention can flexibly control the pesticide spraying range, so as to avoid the waste of resources and the problem of pesticide deposition, and reduce the damage to crops.

Moreover, because each walking mechanism 2 of the present invention adopts a track structure, the robot of the present invention can easily walk and move even on rough and complex terrain of mountain land. Meanwhile, because the suspension strutbeams 27 and the springs 28 are respectively fixed between the track structure bracket 22 and the driven wheel structure brackets 23, it can be ensured that the top of the chassis 1 is always kept level when the intelligent pesticide spraying robot self-adaptive to terrain of mountain land of the present invention walks on rough and complex terrain, so that the various mechanisms arranged on the chassis 1 can operate normally.

Embodiment 2

When spray irrigation is needed, the switch is turned on based on embodiment 1, the second water pump is controlled by the switch to turn on, and the second water pump delivers the water stored in the water storage tank 51 to the second atomizing nozzle 53 through the second water pipe 54 and then sprays same out to achieve the effect of spray irrigation. Thus, the present invention integrates dual functions of spray irrigation and pesticide spraying, so that the robot of the invention can perform spray irrigation and pesticide spraying simultaneously during the traveling process.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

We claim:

1. An intelligent pesticide spraying robot self-adaptive to terrain of mountain land, comprising:
    a chassis internally provided with an accommodating cavity;
    walking mechanisms respectively connected to both side ends of the chassis;
    a pesticide spraying mechanism including rotary drive mechanisms respectively connected to both sides of the rear end of the chassis, telescopic spray boom mechanisms correspondingly connected to the rotary drive mechanisms, rotary nozzle mechanisms correspondingly connected to the telescopic spray boom mechanisms, a liquid pesticide storage box fixed to the top of the chassis, a first water pump fixed in the liquid pesticide storage box, and first water pipes in communication with the first water pump and the rotary nozzle mechanisms; and
    a control identification mechanism including a front-end camera close to the front end of the chassis and fixed to the top of the chassis, side-end cameras respectively fixed to the two sides of the chassis and close to the rear end of the chassis, ultrasonic sensors respectively fixed to the two sides of the chassis and close to the front end of the chassis, a control chip fixed in the chassis and a storage battery, wherein the storage battery is electrically connected to the walking mechanisms, the rotary drive mechanisms, the telescopic spray boom mechanisms, the rotary nozzle mechanisms, the first water pump, the front-end camera, the side-end cameras, the ultrasonic sensors and the control chip respectively, and the control chip is communicatively connected to the walking mechanisms, the rotary drive mechanisms, the telescopic spray boom mechanisms, the rotary nozzle mechanisms, the first water pump, the front-end camera, the side-end cameras and the ultrasonic sensors respectively;

wherein the rotary drive mechanisms comprise: base drive motors, wherein the base drive motors are multiple in number, are close to the rear end of the chassis and are symmetrically fixed to both sides of the accommodating cavity, the output shaft of each of the base drive motors penetrates through the cavity wall of the accommodating cavity and is rotationally connected to the cavity wall of the accommodating cavity by a bearing, and the base drive motors are electrically connected to the storage battery and communicatively connected to the control chip respectively:

base plates, wherein the base plates are multiple in number, are located outside the accommodating cavity and located at the rear end of the chassis, and are fixedly connected to the output shafts of the base drive motors in a one-to-one correspondence mode; and support rods, wherein the support rods are multiple in number, are erected at the rear end of the chassis and correspond to the base plates one to one, one ends of the support rods are fixedly connected to corresponding base plates, and the other ends thereof are free ends; and the telescopic spray boom mechanisms are fixed to the support rods.

2. The intelligent pesticide spraying robot self-adaptive to terrain of mountain land of claim 1, wherein the telescopic spray boom mechanisms comprise:

DC motors, wherein the DC motors are multiple in number and are fixed to the support rods in a one-to-one correspondence mode, and the DC motors are electrically connected to the storage battery and communicatively connected to the control chip respectively;

lead screws, wherein the lead screws are multiple in number and are arranged on the support rods in a one-to-one correspondence mode, and both ends of each of the lead screws are rotationally connected to the corresponding support rods by bearings;

nut blocks, wherein the nut blocks are multiple in number and are e in helix transmission connection with the lead screws in a one-to-one correspondence mode; and moving rods, wherein the moving rods are multiple in number and are fixedly connected to the nut blocks in a one-to-one correspondence mode, one end of each of the moving rods is fixed to the corresponding nut block, the other end thereof is a free end, and each of the moving rods is parallel to the corresponding lead screw; and the rotary nozzle mechanisms are fixed to the free ends of the moving rods.

3. The intelligent pesticide spraying robot self-adaptive to terrain of mountain land of claim 2, wherein the rotary nozzle mechanisms comprise:

steering engines, wherein the steering engines are multiple in number and are fixed to the free ends of the moving rods in a one-to-one correspondence mode, and the steering engines are electrically connected to the storage battery and communicatively connected to the control chip respectively; and first atomizing nozzles, wherein the first atomizing nozzles are multiple in number and are fixed to the output shafts of the steering engines in a one-to-one correspondence mode.

4. The intelligent pesticide spraying robot self-adaptive to terrain of mountain land of claim 3, wherein the liquid pesticide storage box is close to the rear end of the chassis and is fixed to the top of the chassis, and the first water pump is close to the rear end of the chassis and is fixed in the liquid pesticide storage box; and the first water pipes are multiple in number, the multiple first water pipes are in communication with the first water pump respectively, and the multiple first water pipes are connected to the first atomizing nozzles in a one-to-one correspondence mode.

5. The intelligent pesticide spraying robot self-adaptive to terrain of mountain land of claim 3, wherein the control identification mechanism further comprises an automatic light compensation lamp, wherein a camera supporting seat is fixed to the top of the chassis close to the front end of the chassis, the front-end camera and the automatic light compensation lamp are respectively fixed to both sides of the camera supporting seat; and the automatic light compensation lamp is electrically connected to the storage battery and communicatively connected to the control chip respectively.

6. The intelligent pesticide spraying robot self-adaptive to terrain of mountain land of claim 5, further comprising a spray irrigation mechanism, wherein the spray irrigation mechanism includes a switch fixed to the chassis, a water storage tank located between the liquid pesticide storage box and the camera supporting seat and fixed to the top of the chassis, a second water pump fixed in the water storage tank, a second atomizing nozzle fixed in the middle of the camera supporting seat, and a second water pipe in communication with the second water pump and the second atomizing nozzle, wherein the second water pump is electrically connected to the storage battery and the switch respectively.

7. The intelligent pesticide spraying robot self-adaptive to terrain of mountain land of claim 3, wherein the walking mechanism comprises:

a driving wheel drive motor, wherein the driving wheel drive motor is close to the side end of the chassis and is fixed in the accommodating cavity, and the output shaft of the driving wheel drive motor penetrates through the cavity wall of the accommodating cavity and is rotationally connected to the cavity wall of the accommodating cavity by a bearing; and the driving wheel drive motor is electrically connected to the storage battery and communicatively connected to the control chip respectively;

a track structure bracket fixed to the side end of the chassis;

driven wheel structure brackets fixedly connected to the track structure bracket;

a driving wheel, wherein the driving wheel is fixedly connected to the output shaft of the driving wheel drive motor, and the driving wheel is rotationally connected to the track structure bracket;

driven wheels rotationally connected to the driven wheel structure brackets and the track structure bracket respectively;

tracks simultaneously in transmission connection with the driving wheel and the driven wheels respectively;

suspension strutbeams, wherein both ends of each suspension strutbeam are fixed to the track structure bracket and the driven wheel structure brackets respectively; and springs, wherein both ends of each spring are fixed to the track structure bracket and the driven wheel structure brackets respectively.

8. The intelligent pesticide spraying robot self-adaptive to terrain of mountain land of claim 7, further comprising a voltage dropping module, wherein the voltage dropping module is electrically connected to the storage battery, the driving wheel drive motor, the base drive motor, the DC motor, the steering engine, the first water pump, the front-end camera, the side-end camera, the ultrasonic sensor, the automatic light compensation lamp, the control chip, the switch and the second water pump respectively.

9. The intelligent pesticide spraying robot self-adaptive to terrain of mountain land of claim 1, wherein the angles of the sensing part of each of the ultrasonic sensors facing the front end of the chassis and the side ends of the chassis are 45° respectively.

* * * * *